(12) United States Patent
Paris

(10) Patent No.: US 6,339,972 B1
(45) Date of Patent: Jan. 22, 2002

(54) MOTORCYCLE FOOT PEG

(75) Inventor: Joshua A. Paris, Portland, OR (US)

(73) Assignee: Mountainspeed, Portland, OR (US)

( * ) Notice: Subject to any disclaimer, the term of this patent is extended or adjusted under 35 U.S.C. 154(b) by 0 days.

(21) Appl. No.: 09/418,404

(22) Filed: Oct. 14, 1999

(51) Int. Cl.⁷ .............................. G05G 1/18; B62J 25/00
(52) U.S. Cl. ............................ 74/564; 74/563; 280/291
(58) Field of Search ..................... 74/564, 563, 560, 74/594.7, 594.4, 594.6; 280/291; D12/125; 296/75

(56) References Cited

U.S. PATENT DOCUMENTS

| 270,920 A | * | 1/1883 | Woodward et al. ........... 74/563 |
| 388,480 A | * | 8/1888 | Day ....................... 74/564 X |
| 388,981 A | * | 9/1888 | Barbe ..................... 74/564 X |
| D26,337 S | | 11/1896 | Sidwell |
| 1,979,861 A | * | 11/1934 | Bullock ................... 74/564 X |
| 3,161,078 A | | 12/1964 | Pohlkamp |
| D282,652 S | | 2/1986 | Nista |
| 4,591,179 A | | 5/1986 | Nakamura |
| 4,638,682 A | | 1/1987 | Michiyama |
| 4,771,651 A | | 9/1988 | Haro |
| 5,398,570 A | | 3/1995 | Chae |
| 5,609,069 A | | 3/1997 | Swenson |
| 5,638,723 A | | 6/1997 | Lin |
| 5,673,597 A | | 10/1997 | Lin |
| 5,687,617 A | | 11/1997 | Wells |
| 5,826,900 A | * | 10/1998 | Steele ...................... 280/291 |

FOREIGN PATENT DOCUMENTS

GB 2064732 * 6/1981 ................. 74/563

* cited by examiner

Primary Examiner—Mary Ann Green
(74) Attorney, Agent, or Firm—Robert L. Harrington

(57) ABSTRACT

A foot pedal for a cycle has adjustable components on its surface to alter the engagement of the pedal with the boot of a rider of the cycle. Pegs are threadably installed in bores in the pedal and are adjustable upwardly and downwardly to provide a variance in the surface of the pedal. In one embodiment, the frame of the pedal has replaceable support blocks for receiving the adjustable pegs. Another variation has upstanding teeth in combination with the adjustable pegs.

7 Claims, 2 Drawing Sheets

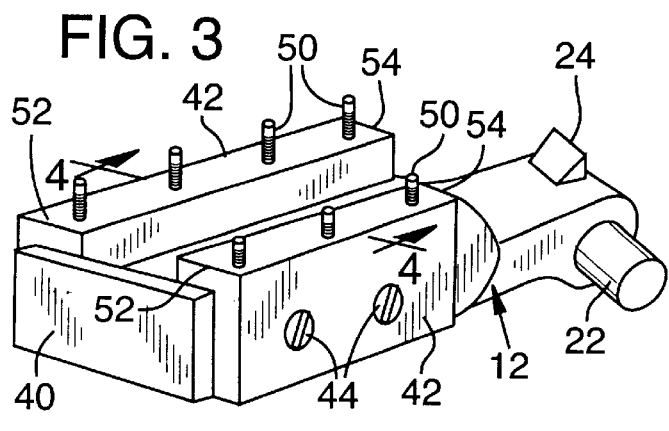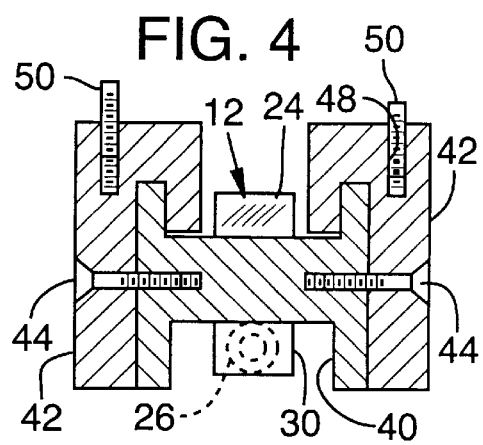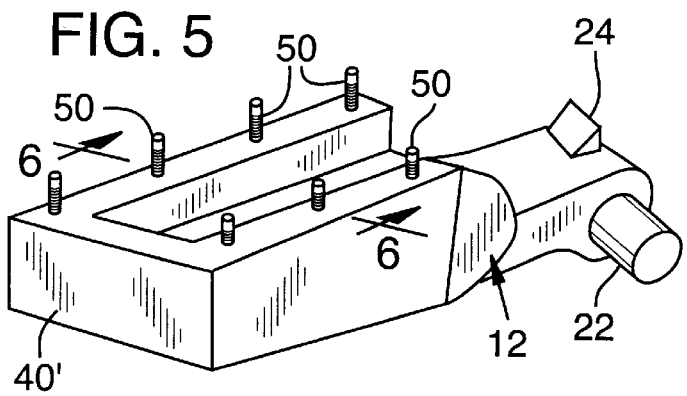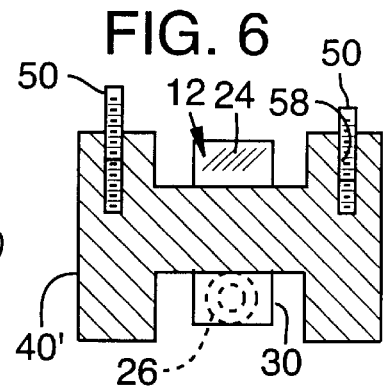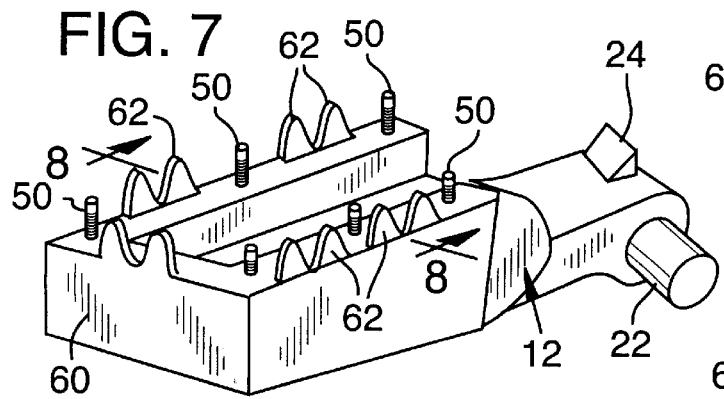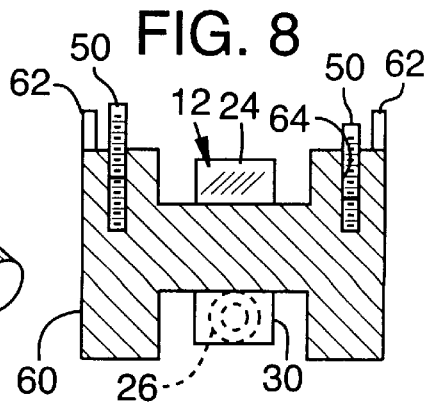

MOTORCYCLE FOOT PEG

FIELD OF THE INVENTION

This invention relates to foot pedals typically mounted on motorcycles used for off road racing.

BACKGROUND OF THE INVENTION

Motorcycle racing involves riding a motorcycle over rough terrain and a major concern for the rider is maintaining balance. The distribution of the rider's weight is important for balance and a rider shifts his weight from side to side as he maneuvers through curves and over bumps. An important feature for accomplishing this weight shifting involves the motorcycle's foot pegs. The same concerns apply to normal or pleasure riding.

A foot peg is a type of pedal that is fixed to the motorcycle frame at each side and is positioned for engagement by the rider's feet. By pushing against one peg or the other, the rider effects a weight shift that helps maintain the desired balance.

Because off road racing also involves mud and dirt that is transferred from the rider's shoe or boot to the pedal and because a firm grip between the foot and pedal is all important, the foot peg is typically designed to have an open frame with cleats forming the engaged surface. The cleats penetrate through the mud and dirt and grip the boot bottom.

Also involved with this issue of balance is the rider's feel of the motorcycle. Location of the pedals or pegs is important but also important is the orientation of the pedal, i.e., the feel of the pedal under the rider's feet. Over time and due in part to wearing, the pedal angle will change and the cleats will wear down to change the feel as well as diminishing the gripping ability of the pedal cleats with he rider's feet.

BRIEF DESCRIPTION OF THE INVENTION

It is an objective of the present invention to improve on the existing foot peg primarily by providing adjustability but also cleat replacement and improved gripping.

The foot peg or pedal is cantilevered from a pivotal connection on the motorcycle frame. It can pivot upwardly and against the frame when out of service and downwardly to a position where the pedal face is laterally extended and engageable by the rider's feet. In the extended position, a protrusion of the pedal abuts the frame of the motorcycle to prevent further downward movement. In a preferred embodiment of the invention, an adjustable pin screwed into the protrusion of the pedal has a head portion that engages the motorcycle frame and dictates the stopped position. As wearing occurs and as the pedal angle starts to change, the pin can be adjusted to extend the head out from the pedal and correct the pedal position to the desired stopped position. Preferably spacers or shims are installed under the pin head to establish a set position.

The cleats are replaced totally or partially with threaded pins or screws. The pins are adjustable to accommodate wearing and also to enable the rider to adjust the camber of the engagement surface, i.e., by raising the outer pins and lowering the inner pins or vice versa. The structure of the pedal can vary to accommodate the adjustable pins and several of such structures are described and illustrated in the following detailed description.

BRIEF DESCRIPTION OF THE DRAWINGS

FIGS. 3 and 4 are views of one embodiment of the foot pedal of FIG. 2;

FIGS. 5 and 6 are views of another embodiment of the foot pedal of FIG. 2; and,

FIGS. 7 and 8 are views of another embodiment of the foot pedal of FIG. 2.

DESCRIPTION OF THE PREFERRED EMBODIMENT

Figure 1:
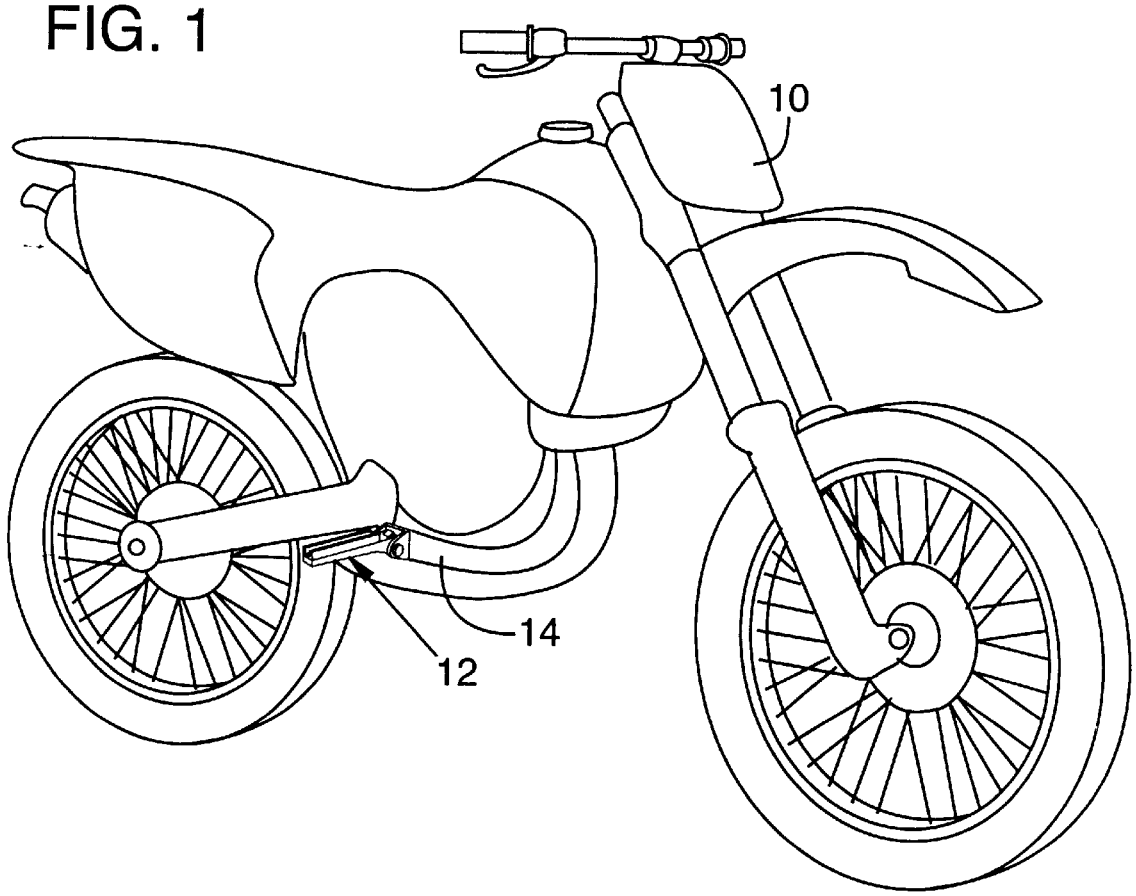
FIG. 1 is a view of a motorcycle.

FIG. 1 illustrates a motorcycle 10 that is suited for off road and competitive racing. An important feature of the motorcycle 10 are the foot pedals 12 that are mounted on each side of the frame 14. The pedals 12 are provided to support the feet of the rider. The rider utilizes the pedals for balance as well as an aid in controlling the motorcycle 10. The present invention is an improved foot pedal for attachment to the motorcycle 10. The foot pedal 12 is pivotally mounted to the frame 14 of the motorcycle 10 and is positioned at a strategic location for use by the rider.

Figure 2:
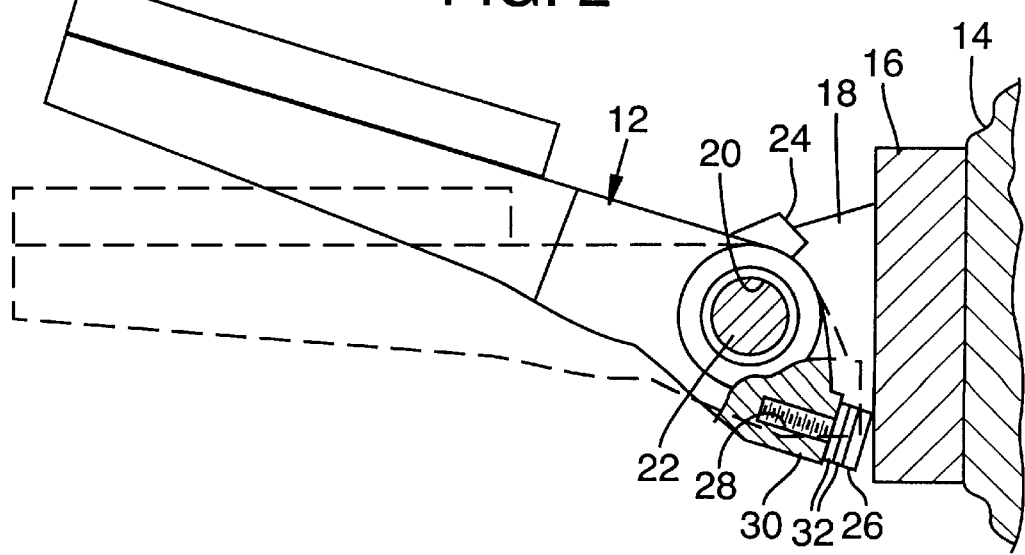
FIG. 2 is a view of a foot pedal mounted to the motorcycle of FIG. 1.

FIG. 2 illustrates the foot pedal 12 pivotally mounted to a bracket 16. The bracket 16 is attached to the frame 14 of the cycle 10 in a conventional manner. The bracket 16 has a boss 18 that has a bore 20 that receives a shaft 22 of the foot pedal 12. The foot pedal 12 is pivotable upwardly and downwardly on the bracket 16. The foot pedal is limited in its upward pivotal movement by a projecting stop 24 that engages the bracket 16. The downward pivotal movement is limited by a stop screw 26 threadably installed in a threaded bore 28 in a lobe 30 of the pedal 12. The stop screw 26 will engage the bracket 16 to limit the downward pivotal movement of the pedal 12. The stop screw 26 is adjustable inwardly and outwardly to vary the downward pivotal movement of the pedal 12. When it is desired to reduce the downward pivotal movement of the pedal 12, spacers 32 are mounted on the screw 26. One or more spacers are used, depending on the degree of pivot that is desired for the pedal 12.

FIG. 2 shows in dashed line the position of the pedal 12 with the screw 26 without spacers against the bracket 16. The pedal is shown in solid line with the screw 26 having multiple spacers 32. The angle of tilt of the foot pedal 12 may thus be controlled by using the screw 26 without spacers 32 or utilizing a spacer (or multiple spacers) 32 on the stop screw 26.

A further feature of the foot pedal 12 is the improved tread of the pedal, that is the surface of the pedal that will be engaged by the boot (shoe) of a rider. It is considered important to have a tread that will provide adequate grip for the boot so that the boot will not slip off of the pedal 12. The pedal of the present invention has an improved tread that will better grip the boot of a rider and further, the tread of the pedal 12 is adjustable.

FIGS. 3 and 4 illustrate one embodiment of a foot pedal 12. The pedal 12 has an extending support frame 40. Mounted to the frame 40 are support blocks 42. The blocks 42 are secured to the frame 40 by conventional fasteners 44 such as screws. Each support block 42 has threaded multiple bores 48 that receive threaded pegs 50. The pegs 50 are installed in the bores 48 in a desired pattern, that is the pegs are threadably installed in the bores 48 to a desired depth. Preferably the pegs 50 have a thread form that is of a known self locking type so that the peg 50 will remain at the set depth in the bores 48. The pegs 50 are adjusted to the desired depth according to the needs of the driver based on the conditions of the course he/she will encounter. For example the pegs 50 may be adjusted to be installed to extend a greater distance from the surface of the support block 42 at the end 52 than at the end 54. This in effect adjusts the camber, i.e. tilt of the tread surface defined by the pegs 50 on the pedal 12. It will be appreciated that each of the pegs 50 are adjustable independently of the others and so the tread surface defined by the pegs 50 may be adjusted to suit the operator of the cycle 10.

FIGS. 5 and 6 illustrate another embodiment of the foot pedal 12. In this embodiment the frame 40' is formed integral with the pedal 12. The frame 40' is provided with bores 58 to receive the pegs 50. The pegs 50 are adjustably mounted in the bores 58 in the same manner as installed in the bores 48 of the support blocks 42. The pegs 50 are adjusted to a depth in the same manner to suit the conditions and the needs of the operator of the cycle 10.

FIGS. 7 and 8 illustrate another embodiment of the foot pedal 12. In this embodiment the frame 60 of the pedal 12 has upstanding teeth 62 (formations) extending along each of the sides of the frame 60. Bores 64 are provided in the frame 60 to receive pegs 50. The pegs 50 are adjustable in the same manner as previously described. The teeth 62 in combination with the pegs 50 provide a tread surface on the pedal 12 that will grip the boot of the operator of the cycle 10.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A foot peg mounted to a frame of a motorcycle, comprising:
  a pedal member connected at one end to the motorcycle frame and cantilevered laterally from the frame and in the cantilevered position defining an upper foot engageable surface;
  said upper foot engageable surface having threaded openings, and threaded pins threadably inserted into the openings, with a portion thereof exposed upwardly from said surface for engagement by a rider's foot, each of said pins adjustable into and out of the respective threaded openings for altering the portion exposed for individual gripping and for collectively defining the camber of the foot support.

2. A foot peg as defined in claim 1 wherein the pedal member comprises a pedal frame and a pedal block removably attached to the frame, multiple of said pins insertable into the block whereby replacement of the block achieves replacement of the multiple pins in the block.

3. A foot peg as defined in claim 2 wherein the frame has a front side and a back side, each of the front and back sides configured to receive the pedal block.

4. A foot pedal as defined in claim 1 wherein the pedal member comprises a frame configuration having front and back blocks in spaced part relation defining a cavity therebetween, said pins insertable into a defined pattern of threaded openings in the front and back blocks.

5. A foot pedal as defined in claim 4 wherein the pattern provides certain of said pins in spaced apart relation and interspersed with fixed cleats.

6. A foot pedal as defined in claim 1 wherein the pedal member is pivotally connected to the frame of the motorcycle for pivoting the pedal member between a raised out of service position and a lower foot supporting position, a lobe provided on the pedal member under the pivotal connection, a head member adjustably projected from said lobe and in engagement with the motorcycle frame with the pedal member in the lower foot supporting position, said adjustment of said head member providing adjustment of the pedal member position at said foot supporting position.

7. A foot peg mounted to a frame of a motorcycle comprising:
  a pedal member, a pivotal connection connecting the pedal member to the motorcycle frame for pivoting the pedal member between a raised out of service position and a lower foot supporting position, a lobe provided on the pedal member under the pivotal connection, a head member adjustably projected from said lobe and into abutting engagement with the motorcycle frame to define the lower foot supporting position of the pedal member, said adjustment of said head member providing pivotal adjustment of the pedal member at said lower foot supporting position.

* * * * *